UNITED STATES PATENT OFFICE.

DANIEL H. MALOY, OF TELFAIR COUNTY, GEORGIA.

IMPROVEMENT IN PLOWS.

Specification forming part of Letters Patent No. 31,549, dated February 26, 1861.

*To all whom it may concern:*

Be it known that I, DANIEL H. MALOY, of Telfair county, State of Georgia, have invented certain new and useful Improvements in Plows, of which the following is a full, clear, and exact description, reference being had to the accompanying drawing, forming part of this specification, in which is represented a perspective view of a plow embracing my improvement.

The object of my improvement in plows is to so arrange the gage for regulating the depth, and also the handles for guiding the plow, that they may be simultaneously adjusted so as to preserve the same relation to each other, and also to arrange the handles so that they may be adjusted to persons of different height; and my invention for effecting this object consists in pivoting the handles to the beam and the gage to the stock, and connecting the gage and the handles with each other, so that in depressing the handles the gage is raised and a lighter furrow made, or, in raising the handles, the gage is also raised and a deeper furrow made, and so that the handles are always the same distance from the surface of the ground in making light or deep furrows.

In the accompanying drawing is represented my improved plow, which in general construction and arrangement is similar to what is known as the "scooter plow;" and consists of a plow-stock, A, to which is attached a beam, B. The handles C of the plow are pivoted to the beam at a convenient distance forward, and extend backward on either side to the stock, to which it is attached by a bolt passing through the stock and through the handles. Several holes, *a*, are bored through the stock, so that the handles may be adjusted at different heights to accommodate different-sized persons using the plow. A rear gage, D, for regulating the depth of furrow, passes through a mortise in the stock, to which it is pivoted, and extends through a mortise in the beam to the handle, and is pivoted at the upper end to a cross-bar, *b*, between the two handles. Several holes are made in the upper end of the gage, in order that when the handles are adjusted to different-sized persons the gage may be adjusted to the handles.

In order to give greater steadiness to the gage, it may be bolted to the beam, when advisable, by a bolt passing through the beam and the gage-iron.

It will be seen from the arrangement of the handles and the gage and their connection with each other that the handles may be adjusted to different-sized persons independent of the gage, and that in adjusting the gage for furrows of different depth with the handles are also adjusted so as to maintain the same relation to the surface of the soil without regard to the depth of the furrow, which greatly facilitates the easy working of the plow.

Having thus described my improvement in plows, what I claim as new, and desire to secure by Letters Patent, is—

The combination of an adjustable gage with adjustable handles, arranged as described, so that in adjusting the gage an adjustment is at the same time effected in the handles.

In testimony whereof I have subscribed my name.

D. H. MALOY.

Witnesses:
 W. C. STUDSTILL,
 JOSEPH WILLIAMS.

D. H. MALOY.
Shovel-Plow.
No. { 545, 31,549. }
Patented Feb. 26, 1861.
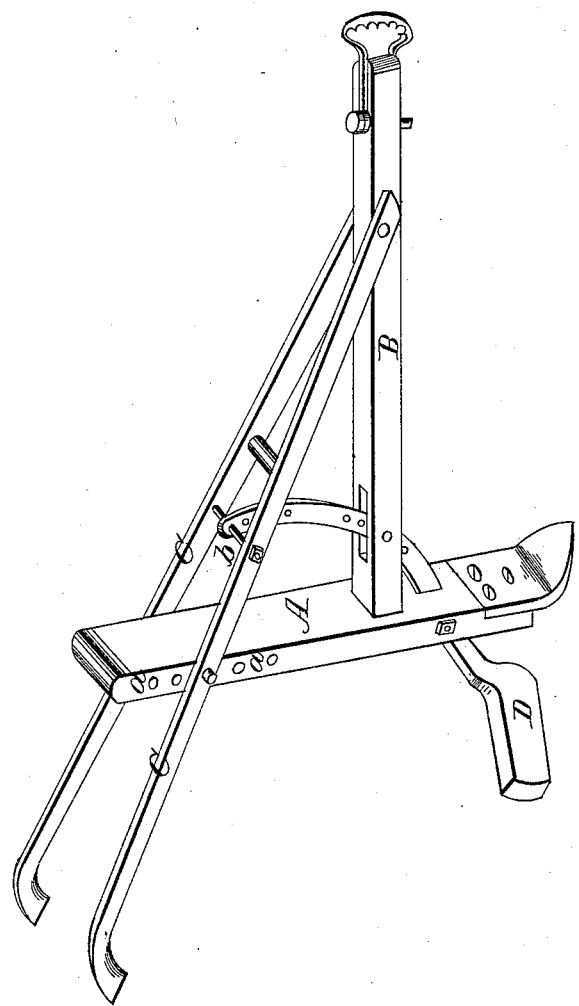
Witnesses.
E. P. Smith
J. Typrowski
Inventor.
D. H. Maloy
by his atty
J. Southgate Smith